Figure 1:
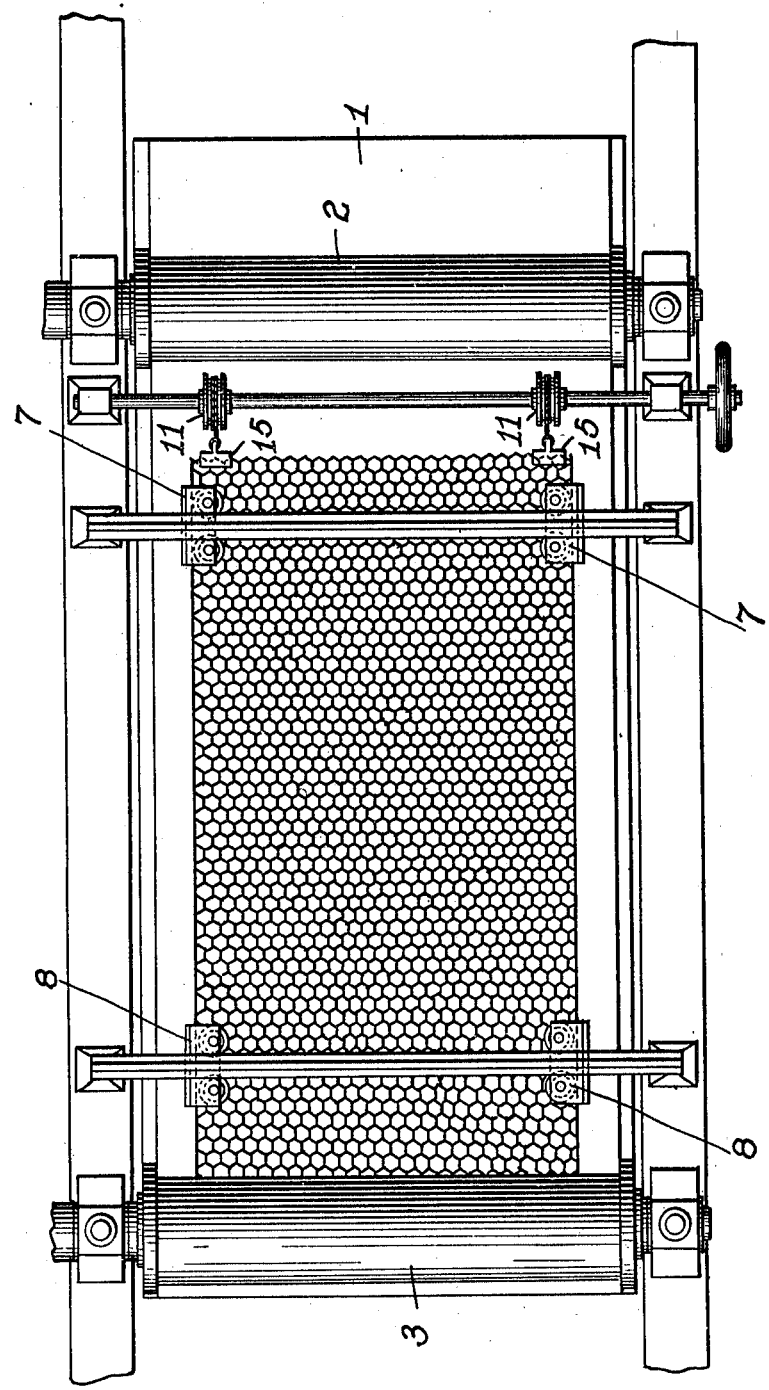

N. FRANZEN.
METHOD OF AND MACHINE FOR MAKING WIRE GLASS.
APPLICATION FILED JUNE 12, 1909.

945,318.

Patented Jan. 4, 1910.
3 SHEETS—SHEET 1.

WITNESSES:
J. Herbert Bradley.
Theodore Duff.

INVENTOR
Nicklas Franzen
by Christy and Christy
Atty/s

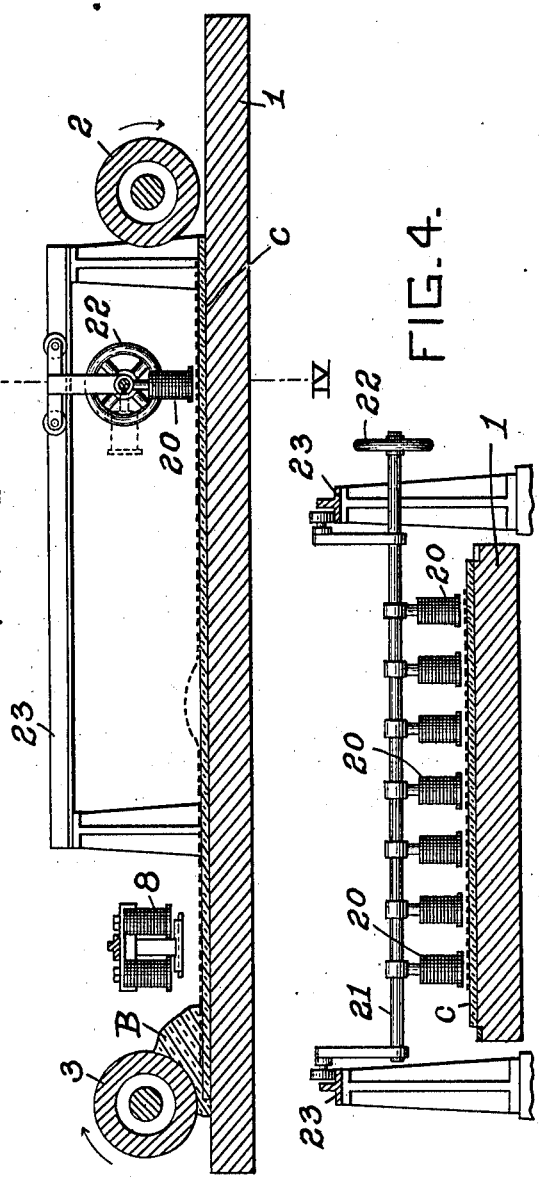

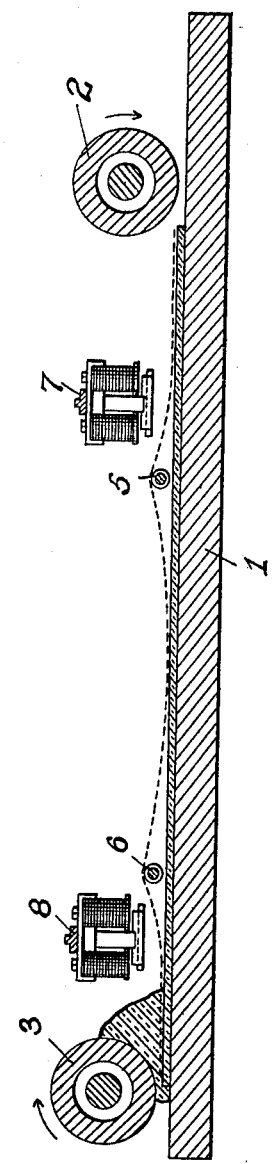

UNITED STATES PATENT OFFICE.

NICKLAS FRANZEN, OF WALTON, PENNSYLVANIA.

METHOD OF AND MACHINE FOR MAKING WIRE-GLASS.

945,318.  Specification of Letters Patent.  Patented Jan. 4, 1910.

Application filed June 12, 1909. Serial No. 501,753.

*To all whom it may concern:*

Be it known that I, NICKLAS FRANZEN, residing at Walton, in the county of Allegheny and State of Pennsylvania, a citizen of the United States, have invented or discovered certain new and useful Improvements in Methods of and Machines for Making Wire-Glass, of which improvement the following is a specification.

My invention relates to improvements in methods of and machines for making wire glass.

The objects of my invention are economy and facility in producing wire glass by the so-called sandwich method.

In the acompanying drawings which form part of this specification, Figure 1 shows in plan view a machine embodying and in its operation performing my present invention; Fig. 2 is a view of the same machine in longitudinal vertical section; Fig. 3 is a view like Fig. 2 illustrating certain modifications in structure, Fig. 4 is a view in cross section on the line IV—IV of Fig. 3; and Fig. 5 is a view similar to Figs. 2 and 3, illustrating a further specific modification.

Parts repeated in the several figures bear the same reference characters in each case.

Certain features of the invention herein defined appear in my copending applications, Serial No. 433,457, filed May 18, 1908, Serial No. 453,472, filed September 17, 1908, and Serial No. 478,601, filed February 18, 1909.

The machine consists essentially of a forming surface, preferably in the form of a horizontally extending casting table, 1, and two rolls, 2 and 3, arranged to spread superposed layers of glass upon the surface of the casting table. To this end the pair of rolls are relatively movable with respect to the casting table, and as shown in the drawings the casting table has motion of translation beneath the rolls, which are rigidly mounted in suitable housings.

The rolls are preferably spaced one from the other at such distance that the initial layer of glass is spread from end to end in its entirety before the second roll begins to spread a second batch of glass upon the initial layer. Means are employed for sustaining the web of wire netting in extended horizontal position above the path of movement of the casting table until the casting table shall come to proper position beneath the web of wire, bearing upon its surface the initial layer of glass; at which moment I deposit the wire upon the surface of the glass allowing it to fall prone, and to rest thereon from end to end. The means shown to this end, and the means which I preferably employ are electromagnets, 7 and 8, since in the use of such means I am certain of the free and instantaneous release of the wire at the precise instant desired. In so supporting and depositing the wire before the formation of the second layer begins I am able to obtain certainty in operation and an accuracy in manipulation of the sleazy wire which is of great importance, and therein lies the first feature of the invention to which I here lay claim.

I preferably employ also means for controlling the position of the wire upon the surface of the initial layer as it is entrained with the glass beneath roll 3 to spread the second layer and complete the sheet. As the operation of the machine progresses the web of wire is being "ironed out" beneath the batch of glass B under roll 3; at the same time, the wire becoming heated is apt to adhere to the surface of the initial layer at one point and another. In consequence of these conditions, and doubtless also in consequence of thermal expansion of the wire, the web is apt to rise in waves, as indicated at *d* in Fig. 2, and such a wave tends to travel rearward in the progress of the operation. If then a sticking point be encountered, the wire is apt to buckle at that point, thus marring the sheet. Such buckling is to be prevented, and various expedients may be adopted. In my first application referred to above, Serial No. 433,457, I place a drag upon the wire, so that, in the operation of the machine there is tension to prevent buckling; in my second application, Serial No. 453,472, I employ stripper bars to this end, interposed between the wire and the surface of the initial layer; it will be apparent also that in the absence of any automatic mechanism, after the wire has been dropped prone upon the glass from end to end, such buckling as I have alluded to may be manually avoided. The operators of the machine may grasp the free rear end of the web of wire with tongs and draw the wire rearward to break the point of adhesion and allow the wire to lie smooth. In my third application, Serial No. 478,601, I have shown organized means for so doing. In this application, wherein I lay claim to the generic invention, I show further specific means to this end in alternative form. In Figs. 1 and 2 I have shown a reel, 11, mounted to rotate in horizontal position above the surface of the casting-table and preferably arranged adjacent to and forward of the initial glass-spreading roll 2. This reel 11 is provided with a web or wrap of pliable material which may be wound upon it, and unwound from it as reel 11 rotates, and to the free end of this web or wrap the rear end of the web of wire may be secured. With such a construction, it will be understood that, as the spreading of the second layer of glass progresses, and as the wire web is gradually carried forward toward roll 3, and buried in the glass, the wrap of pliable material upon the reel 11 will be unwound. The wrap of pliable material upon reel 11 may vary in form and character. For example, in Figs. 1 and 2, two lines are employed, wound upon separate spools, and these lines terminate in clamps 15 engaging the wire.

In Fig. 3 I have shown, in place of a clamp carried at the end of a wrap wound and unwound upon a reel, an electromagnet, 20, preferably mounted to advance as the machine operates, following the free end of the wire to the bite beneath roll 3. Whether so movable or not, this electromagnet is arranged adjacent to and above the wire as it advances to roll 3 and its proximity is such that its magnetic force is efficient to lift the wire free of the surface of the initial layer as may be desired and so eliminate buckling. The electromagnet, or more correctly this series of electromagnets, for I preferably arrange a number in line, extending from side to side across the machine, is preferably carried on a bar or shaft 21 mounted to turn in suitable supports and equipped with a hand wheel, 22, that the magnets may be swung to and from operative position. In Fig. 3 I have shown in dotted lines the magnet in inoperative position. The shaft with its series of electromagnets may conveniently be carried in supports which travel along a suitably arranged overhead runway, 23, to permit of the magnets following the wire as it advances to roll 3.

As indicated in Fig. 3, the series of electromagnets 20 may take the place of the pair of electromagnets, 8.

In Fig. 5 I have for greater particularity shown another alternative expedient to the end described, this being what is disclosed and described in my application Ser. No. 453,472 referred to above. In this figure, in addition to the parts already identified and described, are shown stripper-bars 5 and 6. These extend transversely above the table and are preferably mounted to remain stationary while the table travels beneath them. The wire falling from above upon the initial layer when the magnets are demagnetized rises in waves over these bars of which there are preferably but not necessarily two. In the operation of the machine the advance of the table with the initial layer upon it causes the wire to be progressively raised from contact with the glass and to descend upon it again, and in this movement of the wire adhesion of the nature described is broken.

The operation of the machine and the method performed in its operation, will readily be understood. A batch of glass is teemed upon the casting table when it stands to the right of roll 2, and as the table passes beneath roll 2 that batch is spread to a layer C upon the table top. When the machine comes to the position illustrated in Fig. 2, the initial layer spreads from end to end between the two rolls 2 and 3, the wire is released from the magnets 7 and 8 and falls prone and lies upon layer C from end to end. The second batch of glass is then immediately teemed upon the wire covered layer C immediately at the right of roll 3 and the continued operation of the machine spreads this batch and completes the sheet. As the spreading of the second layer progresses, in case the wire lying exposed upon layer C rises in waves it may be released at the points of sticking by any one of the alternative means to that end which are herein described or referred to, to prevent buckling, while the operation progresses without interruption.

I claim as my invention:

1. The method of making wire glass described herein which consists in spreading an initial layer of glass, maintaining a web of wire in horizontal position and when said initial layer is completed letting said horizontally maintained web fall free by gravity and lie prone upon the surface of said initial layer, and spreading a second layer of glass upon said initial layer with the wire so applied to it.

2. The method of making wire glass described herein which consists in spreading an initial layer of glass, applying a web of wire to the surface thereof, spreading a second layer of glass upon said initial layer with the wire applied to it, and, as the spreading of said second layer progresses releasing the web of wire from adhesion to the initial layer.

3. In a machine for making wire glass the combination of a forming surface, a pair of rolls coöperating with said table to spread thereon superposed layers of glass, means for sustaining a web of wire above said forming surface and between said rolls and for releasing the wire so sustained at a desired point in the operation of the machine, and an electromagnet movable between said rolls, as and for the purpose described.

4. In a machine for making wire glass by the sandwich method an electromagnet placed above the plane in which the sheet of wire glass is formed, and arranged in proximity thereto, to the end that the web of wire lying on the initial layer before being covered with the glass of the second layer may, as the operation of the machine progresses, come within the influence of said magnet and be raised thereby from the surface on which it rests, substantially as described.

5. In a wire glass machine an electromagnet mounted to turn in a support above the plane in which the sheet of wire glass is formed, but adjacent thereto, as and for the purposes described.

In testimony whereof, I have hereunto set my hand.

NICKLAS FRANZEN.

Witnesses:
FRIEDA E. WOLFF,
CHARLES BARNETT.